United States Patent [19]

Nishiyama et al.

[11] Patent Number: 4,654,785

[45] Date of Patent: Mar. 31, 1987

[54] INFORMATION PROCESSING SYSTEM

[75] Inventors: Takaaki Nishiyama, Hadano; Masahiro Hashimoto, Sagamihara, both of Japan

[73] Assignee: Hitachi, Ltd., Tokyo, Japan

[21] Appl. No.: 637,137

[22] Filed: Aug. 3, 1984

[30] Foreign Application Priority Data

Aug. 18, 1983 [JP] Japan ................. 58-150618

[51] Int. Cl.⁴ ............................................. G06F 9/42
[52] U.S. Cl. ..................................... 364/200; 364/748
[58] Field of Search ... 364/200 MS File, 900 MS File, 364/748

[56] References Cited

U.S. PATENT DOCUMENTS

| | | | |
|---|---|---|---|
| 3,614,747 | 10/1971 | Ishihara et al. | 364/200 |
| 4,038,643 | 7/1977 | Kim | 364/200 |
| 4,161,784 | 7/1979 | Cushing | 364/748 |
| 4,179,737 | 12/1979 | Kim | 364/200 |
| 4,338,675 | 7/1982 | Palmer et al. | 364/200 |

*Primary Examiner*—David Y. Eng
*Attorney, Agent, or Firm*—Antonelli, Terry & Wands

[57] ABSTRACT

An information processing system having a plurality of arithmetic units such as a general instruction arithmetic unit and a floating point instruction arithmetic unit comprises means provided for each of the arithmetic units, for generating a condition code for use in branch judgement of a conditional branch instruction, branch judgement means provided in each arithmetic unit for judging success or failure of a branch of the conditional branch instruction by using the condition generated by the respective code generating means, and a judgement unit decision circuit responsive to the operation state of each arithmetic unit for generating an instruction signal indicating which of the judging means is to be operated to and supplying it to the branch judgement means, whereby branch control is carried out by using either one of the branch judgement results obtained in the respective arithmetic units as a valid one.

23 Claims, 13 Drawing Figures

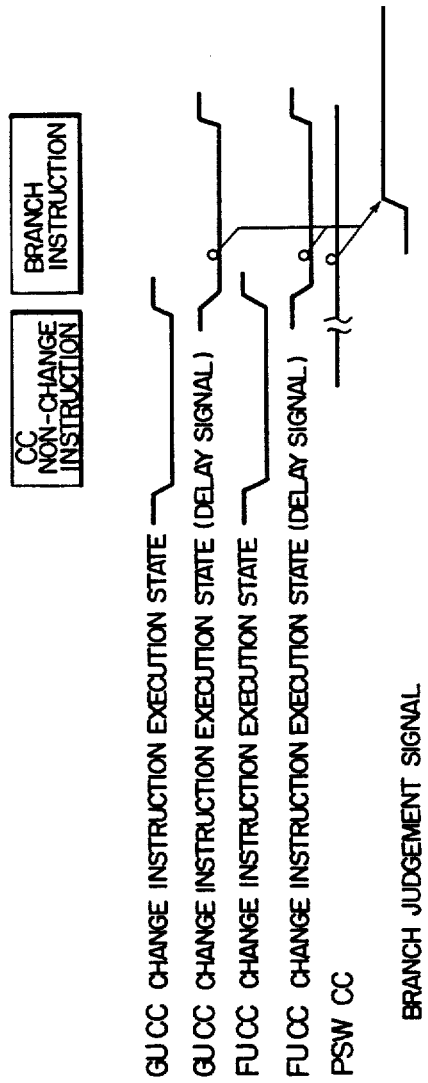

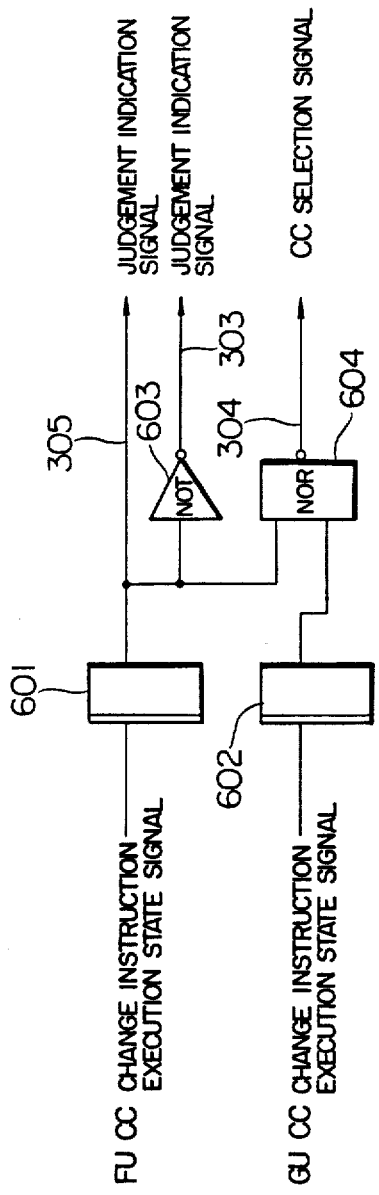

FIG. 7B

```
(X)₁₆ ADDRESS   L    LOAD INSTRUCTION
(X+4)₁₆         L    LOAD INSTRUCTION
(X+8)₁₆         AE   FLOATING POINT ADDITION INSTRUCTION (CC CHANGE INSTRUCTION)
(X+C)₁₆         BC   BC INSTRUCTION (Y)₁₆ ADDRESS   L    LOAD INSTRUCTION (TARGET INSTRUCTION)
(Y+4)₁₆         L    LOAD INSTRUCTION
```

FIG. 8A

```
L  INSTRUCTION            D A L E
L  INSTRUCTION              D A L E
A  INSTRUCTION                D A L
BC INSTRUCTION                       CONDITION CODE (GU)
                                     BRANCH JUDGEMENT (GU)
                                                        |← THREE CYCLES →|
L  INSTRUCTION (TARGET)                                  D A L E
L  INSTRUCTION                                             D A L E
```

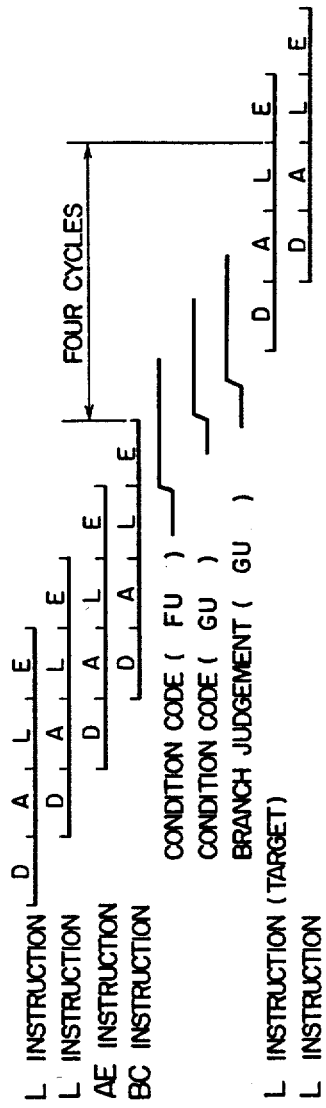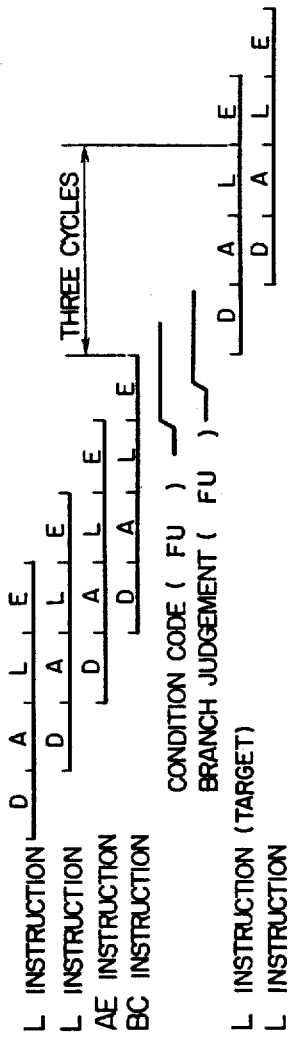

INFORMATION PROCESSING SYSTEM

BACKGROUND OF THE INVENTION

This invention relates to an information processing system including plural arithmetic units for implementing a high speed processing of instructions.

The implementation of high speed processing in recent years has brought about a system having an arithmetic section divided into a plurality of dedicated arithmetic units in many information processors. For example, there has been proposed a system having an arithmetic section divided into two units, i.e., a general instruction arithmetic unit (GU) for executing a fixed-point instruction, a decimal instruction etc. and a floating-point instruction arithmetic unit (FU) for executing a floating-point instruction at a high speed. A certain system may have an arithmetic unit divided into more sub-arithmetic units. In such an information processing system, if a conditional branch instruction is provided for which a judgement about the success or failure of a branch is determined by a condition code (CC) of a Program Status Word (PSW), and this CC is determined by an operation result, it is required that the CC be created by the corresponding arithmetic unit and be finally transferred to a CC part of a PSW. The transfer time of the CC from each arithmetic unit to branch judgement means influences the performance of the conditional branch instruction.

FIG. 1 shows a block diagram of an information processing system having two arithmetic units. In the figure, a main storage unit (MS) 1, a storage control unit (SCU) 2, and an instruction control unit (IU) 3 are usual ones, but an arithmetic unit 4 is characterized by having an general instruction arithmetic unit (GU) 5 and a floating-point instruction arithmetic unit (FU) 6.

FIG. 2 shows an example of the conventional construction of GU 5 and FU 6. In the figure, it is assumed that a general instruction arithmetic device 201 in GU 5 performs a fixed-point operation and a decimal operation while a floating-point instruction arithmetic device 210 in FU 6 performs a floating-point operation. CC creation circuits 202 and 211 respectively in GU 5 and FU 6 create CC's in accordance with the respective forms of instruction by using the results of the above operations. The CC's thus created are transferred via signal lines 203, 212 and loaded in a CC portion 205 of a PSW through a selector 204. In this example, the CC portion 205 of the PSW is placed in the GU 5, and the CC portion 205 in FU 6 is transferred to GU 5, but the CC portion 205 of the PWS may be placed in either unit. In either case, the CC's created in a plurality of units must be concentrated where a branch judging circuit 207 is present. The selector 204 acts as a circuit for selecting the CC of GU 5 (GU CC) in response to a fixed point/decimal instruction and for selecting the CC of FU 6 (FU CC) in response to a floating point instruction.

Concurrently with the storing of the CC of GU 5 or FU 6 into the CC portion 205 of the PSW, the CC of GU 5 or FU 6 is inputted to a branch judging circuit 207 through a selector 206. The selector 206 serves to select GU CC on signal line 203 when a GU CC change instruction which is executed in the GU 5 to change the previous CC (such as a fixed point addition instruction) exists immediately before a conditional branch instruction (BC instruction: Branch on Condition instruction), to select an FU CC on signal line 212 when an FU CC change instruction which is executed in the FU 6 to change the previous CC, (such as floating point addition instruction) exists and to select a CC of the PSW when another instruction exists. The CC on the signal line 212 or 203 is selected to speed up the branch judgement. The judgement result by a branch judgement circuit 207 is sent out to IU 3 through a branch judgement signal line 208. The IU 3 serves to allocate one instruction buffer (now shown) for each of a main instruction stream and a target instruction stream to speed up the processings upon the generation of a branch instruction. Such control method is known from U.S. Pat. No. 3,614,747. In the case of success of the branch, instruction fetching and instruction decoding in a main stream of the instruction (a stream including the BC instruction) are stopped, the instructions contained in the instruction buffer for the main stream are cancelled, and instruction decoding of the target stream is also started. Incidentally, it is assumed that instruction fetching from the target instruction has been started at the time of decoding of the BC instruction. On the other hand, in the case of failure of the branch, the instruction fetching from the target stream is stopped and the main stream of instructions is continued. These processings are controlled by a branch control circuit 209.

Meanwhile, a problem of the prior art is that since a branch judgement circuit is placed in the GU, a branch judgement is delayed by the time of transferring the CC from FU to GU when an FU CC change instruction exists immediately before a BC instruction, thereby reducing the performance of a BC instruction. This problem also applies in the case where the branch judgement circuit is provided in the FU.

SUMMARY OF THE INVENTION

An object of this invention is to provide an information processing system having a plurality of arithmetic units in which a high-speed branch judgement of a BC instruction is implemented to early start the decoding of a target instruction in the case of a success of branch, thereby to minimize the branch overhead.

In the information processing system having a plurality of arithmetic units, each arithmetic unit produces a condition code on the basis of the corresponding operation result so that the branch judgement of a BC instruction at one place requires the time of transferring the condition code from the arithmetic unit to that place, thereby retarding the branch judgement. Therefore, in accordance with this invention, a branch judgement circuit is provided in each arithmetic unit, a branch judgement unit is decided by means for indicating what arithmetic unit provides the newest condition code, and in compliance with this decision each arithmetic unit performs the branch judgement by using the condition code issued in itself, thereby making unnecessary the transfer time of the condition code and so permitting high speed branch judgement.

BRIEF DESCRIPTION OF THE DRAWINGS

The present invention will be apparent from the following detailed description taken in conjunction with the accompanying drawings, in which:

FIGS. 5A to 5C are timing charts for explaining an operation algorithm of the judgement unit decision circuit as shown in FIG. 3;

FIG. 6 is a diagram showing an exemplary concrete construction of the above judgement unit decision circuit;

FIGS. 7A and 7B are illustrations showing one example of a stream of instructions; and FIGS. 8A to 8C are timing charts for comparing the prior art with this invention.

DETAILED DESCRIPTION OF THE PREFERRED EMBODIMENTS

Figure 2:
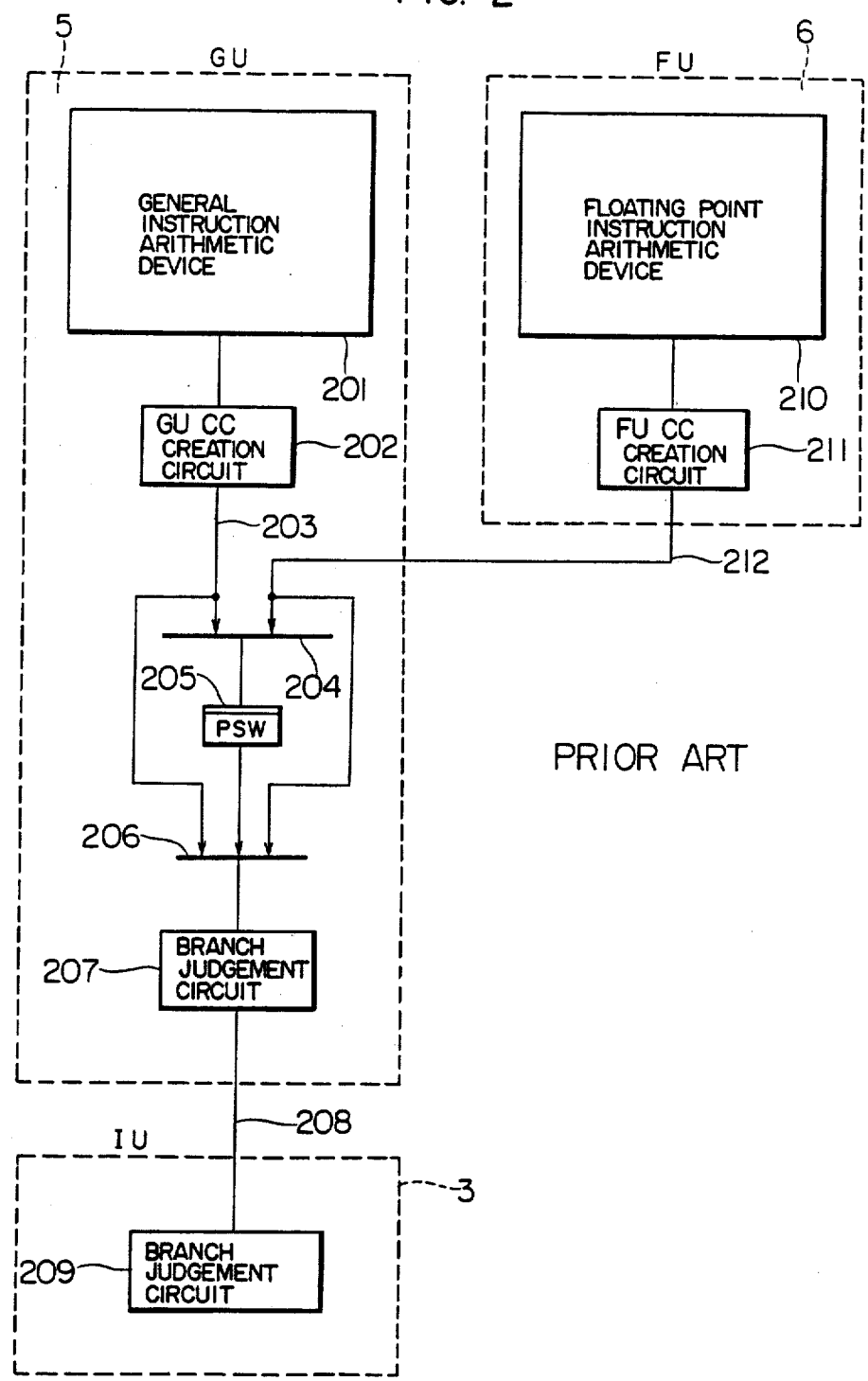
FIG. 2. is a block diagram showing one example of the conventional construction of a plurality of arithmetic units with respect to only CC control.
Figure 3:
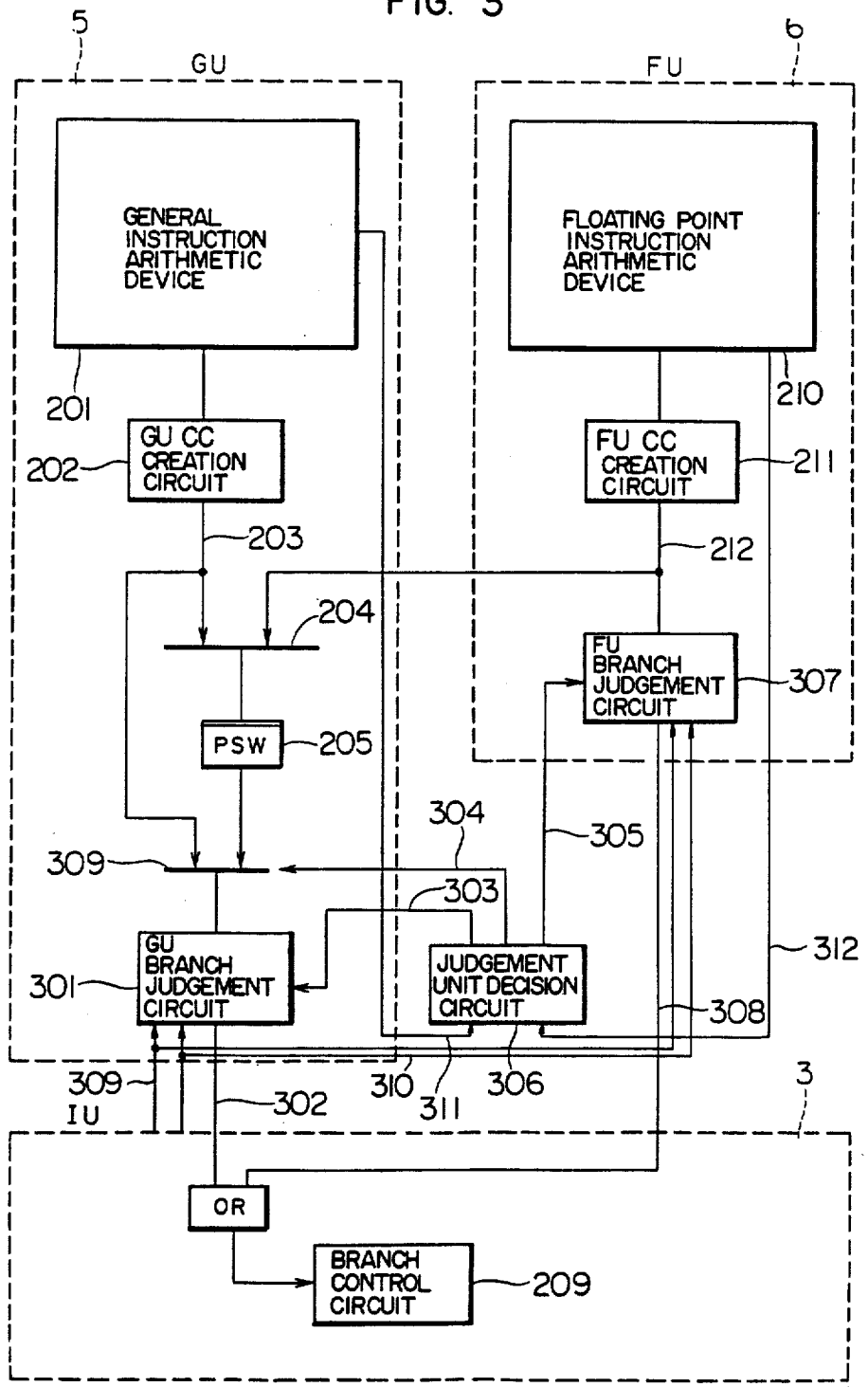
FIG. 3 is a block diagram showing one embodiment according to this invention.

FIG. 3 shows one embodiment of this invention and is different from FIG. 2 in that branch judgement circuits 301, 307 are provided in GU 5 and FU 6, respectively, which is accompanied by a judgement unit decision circuit 306 for indicating by which branch judgement circuit the branch judgement should be made, and branch judgement signal lines 302, 308 are sent out from respective GU 5 and FU 6 to IU 3. The operation of FIG. 3 will be explained below.

An operation of a fixed point/decimal instruction is performed by a general instruction arithmetic device 201 in GU 5, and on the basis of its result, a CC is generated by a GU CC creation circuit 202. This GU CC is loaded in a CC part 205 of a PSW through a signal line 203 and a selector 204 and also inputted to a branch judgement circuit 301 in GU 5 through a selector 309. On the other hand, an operation of a floating point instruction is performed by a floating point instruction arithmetic device 210 in FU 6, and on the basis of its result, a CC is generated by an FU CC creation circuit 211. This FU CC is inputted to an FU branch judgement circuit 307 through a signal line 212 and also loaded into a CC part 205 of the PSW through the selector 204.

Concurrently with the above operation, in the case where a BC instruction comes immediately after a GU CC change instruction, the judgement unit decision circuit 306 sets a CC selection signal line 304, a GU judgement indication signal line 303 and an FU judgement indication signal line 305 to "0", "1" and "0", respectively. Accordingly, the CC from the GU CC creation circuit 202 is inputted to the GU branch judgement circuit 301 through the signal line 203 and the selector 309 while the GU branch judgement circuit 301 is activated by the GU judgement indication signal 303, and the result of GU branch judgement is sent to IU 3 through the signal line 302.

In the case where the BC instruction comes immediately after an FU CC change instruction, the judgement unit deciding circuit 306 sets the CC selection signal line 304, GU judgement indicating signal 303, and the FU judgement indication signal line 305 to "0", "0" and "1", respectively. Thus, the FU branch judgement circuit 307 is activated by the FU indication judgement signal line 305, a branch judgement is made by CC from the signal line 212, and the result of branch judgement is sent to IU 3 through the signal line 308.

In the case where GU CC and FU CC change instructions do not exist immediately before the BC instruction, the judgement unit decision circuit 306 sets the CC selection signal line 304, the GU judgement indication signal line 303 and the FU judgement indication signal line 305 to "1", "1" and "0", respectively. Thus, the CC part 205 of the PSW is inputted to the GU branch judgement circuit 301 through the selector 309 while the GU branch judgement circuit 301 is activated by the GU judgement indicating signal 303, and a branch judgement is made by PSW CC, and the result of GU branch judgement is sent to IU 3 through the signal line 302.

The branch judgement results on the signal lines 302 and 308 are ORed so as to be inputted to the branch control circuit 209. This branch control circuit 209 operates in the same manner as mentioned in the prior art referring to FIG. 2.

Figure 4:
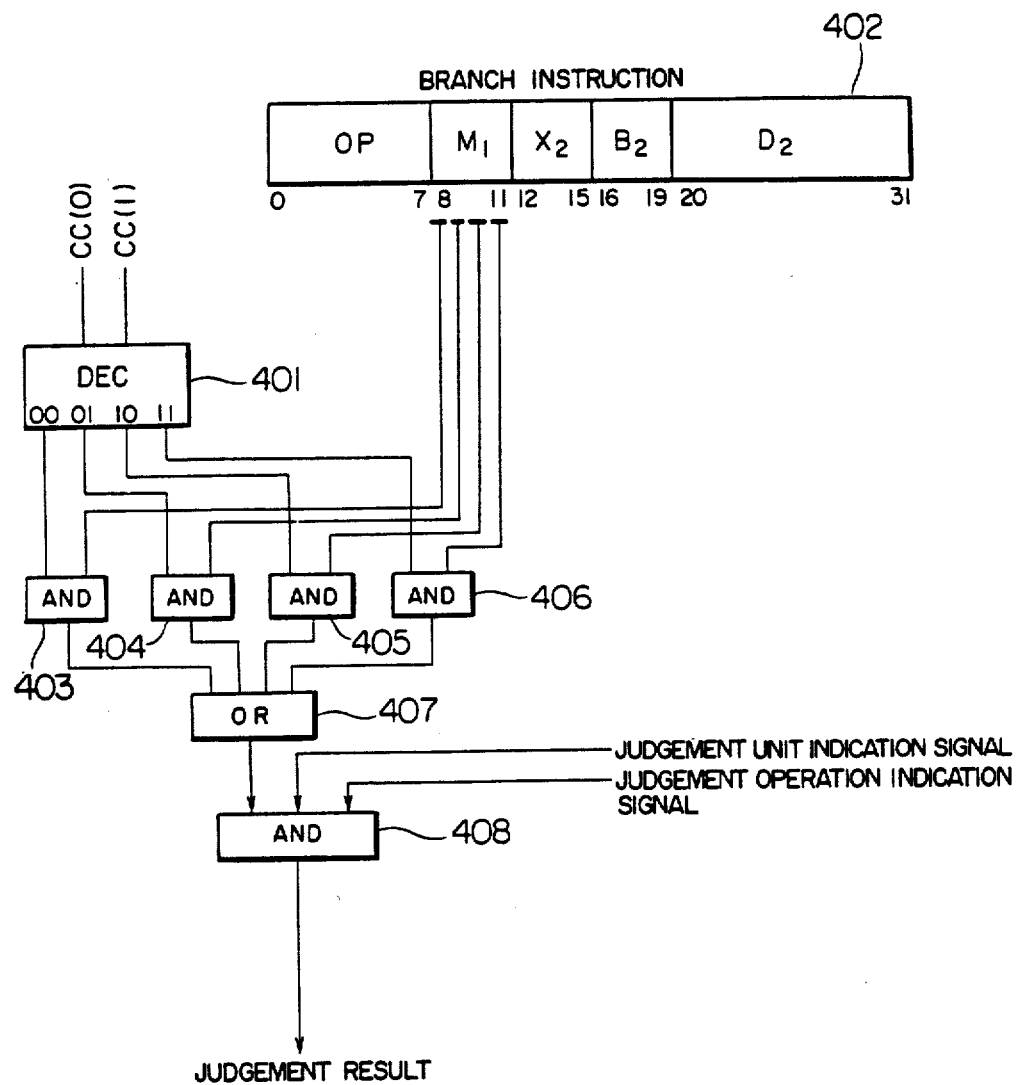
FIG. 4 is a circuit diagram of an exemplary concrete construction of the branch judgement circuit as shown in FIG. 3.

FIG. 4 shows an exemplary construction of the GU branch judgement circuit 301 and the FU branch judgement circuit 307. In this case, a CC is composed of two bits. In the case of an addition instruction, for example, "00", "01", "10" and "11" represent "zero", "smaller than zero", "larger than zero" and "overflow", respectively. This CC is decoded by a decoder 401. The thus decoded signal and a mask part ($M_1$) of a branch instruction 402 which is provided from IU 3 through signal line 309 and ANDed by AND circuits 403-406 thereby makes a judgement of success of the branch when the result is "1", and a judgement of failure of the branch when the result is "0". The judgement results are ORed by an OR circuit 407, are ANDed together with a judgement operation indication signal and a judgement unit indication signal by an AND circuit 408 and sent out. The judgement operation indication signal is generated from IU 3 through signal line 310 during the execution of the BC instruction. As the judgement unit indication signal, in the GU branch judgement circuit 301, the signal on the GU judgement indication signal line 303 of FIG. 3 is applied thereto while in the FU branch judgement circuit 307, the signal on the FU judgement indication signal line 305 is applied thereto. That is, GU branch judgement circuit 301 and FU branch judgement circuit 307 perform a judgement operation only when the judgement operation indication signal is "1" and the judgement unit indication signal is "1".

FIGS. 5A, 5B and 5C and FIG. 6 show diagrams for explaining a judgement unit decision circuit 306.

Figure 5A:
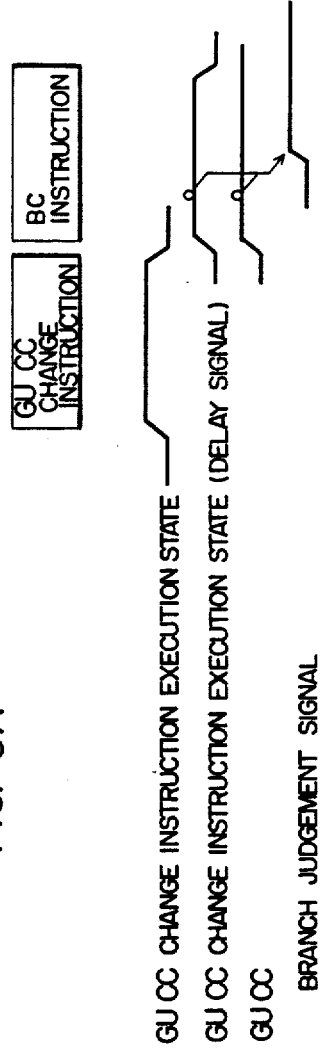
Figure 5B:
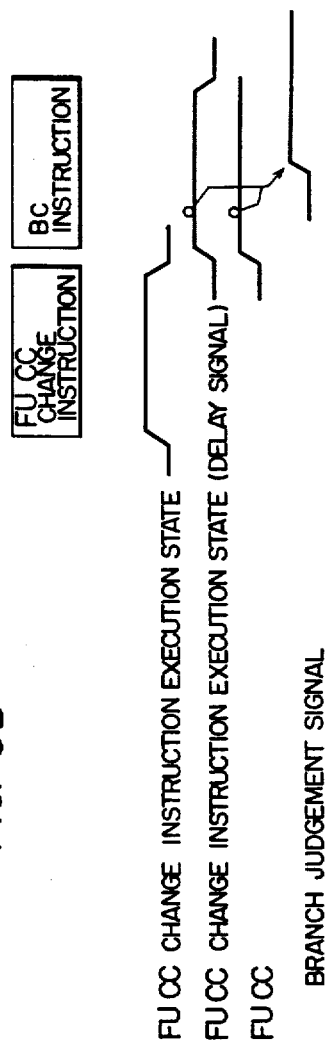

FIGS. 5A-5C show timing charts of an algorithm of deciding a branch judgement unit in the case where the BC instruction and the GU CC change instruction and FU change instruction are adjacent to each other. FIG. 5A shows the case where the GU CC change instruction exists immediately before the BC instruction. In this case, one cycle delay signal indicating the fact that the GU CC change instruction is being executed is "1" at the time of branch judgement, so that the branch judgement can be performed by using the GU CC. FIG. 5B shows the case where the FU CC change instruction exists immediately before the BC instruction. In this case also, as in FIG. 5A, one cycle delay signal indicating the fact that the FU CC change instruction is being executed is "1" at the time of branch judgement, so that the branch judgement can be performed by using the FU CC. FIG. 5C shows the case where neither a GU change instruction nor a FU change instruction exists immediately before the BC instruction. In this case, the branch judgement can be performed by the PSW CC.

FIG. 6 shows an exemplary construction of the judgement unit decision circuit 306. On the basis of the algorithm as shown in FIGS. 5A to 5C, the signal on the FU judgement indication signal line 305 can be obtained by delaying the signal representative of the fact that the FU CC change instruction is being executed by a delay latch 601 by one cycle while the signal on the GU judgement indication signal line can be obtained by passing an output from the delay latch 601 through an inverting circuit 603. The signal on the CC selection signal line 304 can be obtained in such a manner that the output from the delay latch 601 and the output, resulting from the signal representative of the fact that the GU CC change instruction is executed being delayed by the delay latch 602 by one cycle, are NORed by a NOR circuit 604. Incidentally, the signal representative of the fact that the GU CC change instruction and FU CC change instruction are being executed may be obtained from the GU 5 and FU 6 through signal lines 311 and 312, respectively.

Next, referring to a concrete example, an explanation will be made as the fact that this invention implements a higher speed branch judgement instruction operation of a BC instruction than the prior art.

FIGS. 7A and 7B show examples where an CC change instruction exists immediately before the BC instruction. Although it is assumed that in FIGS. 7A and 7B instructions other than the BC instruction and the CC change instruction are load instructions (L), any instruction may be applicable. FIG. 7A shows the case where a fixed point addition instruction (A) as a CC change instruction exists immediately before the BC instruction, and in this case, the branch judgement by be CC in GU 5 must be performed. FIG. 7B shows the case where a floating point addition (AE) as a CC change instruction exists immediately before the BC instruction, and in this case the branch judgement by the CC in FU 6 must be performed.

FIG. 8A is a timing chart showing when the stream of instructions are executed and a success of the branch is attained. In the figure, characters D, A, L, and E indicate stages of an instruction pipe line, which are an instruction decode, address calculation, operand load and execution stage. The CC created by an A instruction is defined as the CC in GU 5 at the end of the E stage of the A instruction, and the branch judgement is made after a half cycle, and after a further half cycle the decoding of a fetched target instruction is started. As understood from FIG. 7A, three cycles are required from the completion of execution of the BC instruction to the start of execution of the target instruction. This timing entirely applies to both the prior art and this invention. This is because the branch judgement circuit 207 of FIG. 2 and the branch judgement circuit 301 of FIG. 3 are located at the same portion.

Figure 1:
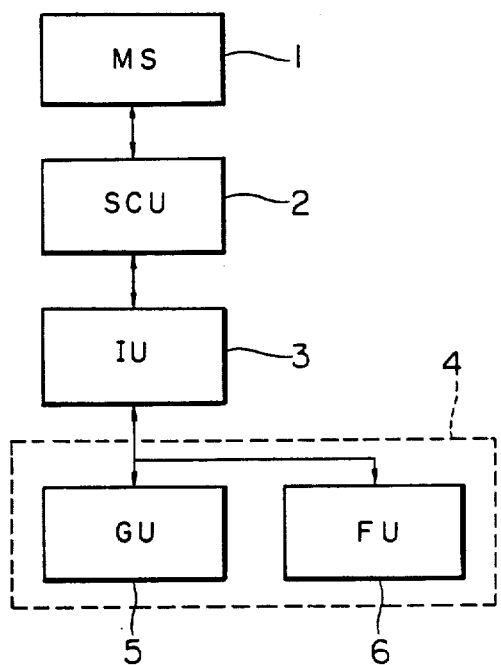
FIG. 1 is a block diagram showing, an example of an information processing system having a plurality of arithmetic units.

FIG. 8B shows a timing chart of the prior art when a stream of instructions of FIG. 7B are executed and a success of the branch is attained. The CC generated by an AE instruction is defined as a CC in FU 6 at the end of the E stage of the AE instruction in FU 6. However, one cycle is required to transfer this FU CC to GU 5 in FIG. 1 so that the branch judgement in GU 5 is performed after a further half cycle and the decoding of the target instruction is performed after a further half cycle. Therefore, four cycles are required from the completion of the BC instruction to the start of execution of the target instruction. That is, an excess of one cycle is required as compared with the case of GU CC.

FIG. 8C shows a timing chart of this invention when a stream of instructions are executed and a success of the branch is attained. This is the same as FIG. 8C in which three cycles are required from the completion of execution of the BC instruction to the start of execution of the target instruction, i.e., a reduction of one cycle is made as compared with the prior art of FIG. 8B. That is, the CC of the AE instruction is defined as an FU CC at the end of the E stage of the AE instruction, the branch judgement is made in FU 6 after a half cycle and the decoding of the target instruction is started in IU 3 after a further half cycle.

Although one embodiment of this invention has been explained hereinbefore, it is of course apparent that this invention is not limited thereto. For example, in the embodiment the branch judgement by PSW CC is performed in the case of absence of the CC change instruction immediately before the BC instruction. However, with the CC changed lastly in each unit being held, the CC of the unit in which the CC has been lastly changed before the BC instruction may be used for branch judgement.

As understood from the above explanation, in accordance with this invention, there is provided a branch judgement circuit for each arithmetic unit in an information processing system including plural arithmetic units so that a high-speed branch judgement of a conditional branch instruction, i.e., an improvement of the performance of the conditional branch instruction can be attained.

We claim:

1. An information processing system comprising:
an instruction control unit for issuing instructions and for generating test information designated by a conditional branch instruction when the conditional branch instruction is issued;
a plurality of arithmetic means each for executing arithmetic instructions and each for generating a condition code when a condition code change arithmetic instruction is executed;
a plurality of judgement means, each connected to a corresponding one of said aritmetic means, and each for testing a condition code generated by the corresponding arithmetic means based on said test information received from said instruction control unit; and
decision means connected to said plurality of arithmetic means for supervising which of said plurality of arithmetic means generates the newest condition code and for supplying a select signal to one of said judgement means connected to that one of said arithmetic means which generates the newest condition code;
each of said judgement means including means for outputting the result of the test operation therein in response to said select signal from said decision means when said instruction control unit issues a conditional branch instruction, and said instruction control unit being connected to said decision means for deciding on the next instruction to be issued based on the result of the test operation outputted from a judgement means.

2. An information processing system according to claim 1, wherein one of said plurality of arithmetic means is a means for executing a floating decimal point instruction.

3. An information processing system according to claim 1, wherein said decision means comprises means for storing a plurality of state signals each of which represents whether or not the corresponding arithmetic means executes the condition code change arithmetic instruction and means for generating said select signal based on the stored state signals.

4. An information processing system according to claim 1, wherein the number of said arithmetic means is two.

5. An information processing system according to claim 4, wherein said decision means comprises means for storing a state signal which represents whether or not one of the two arithmetic means executes a condition code change arithmetic instruction, and means for supplying said stored state signal to one of said arithmetic means and for supplying a signal which is the complement of said stored state signal to the other arithmetic means.

6. An information processing system according to claim 1, wherein said instruction control unit includes means for generating a mask of the condition branch instruction as said test information.

7. An information processing system according to claim 6, wherein each judgement means comprises means for decoding said condition code and means for comparing said mask with the decoded condition code.

8. An information processing system comprising:
an instruction control unit for issuing instructions and for generating test information designated by a conditional branch instruction when the conditional branch instruction is issued;
a plurality of arithmetic means each for executing arithmetic instructions and each for generating a condition code when a condition code change arithmetic instruction is executed;
storage means commonly connected to said plurality of arithmetic means for storing the condition code generated by said arithmetic means, said storage means storing a new condition code when one of said plurality of arithmetic means generates a condition code;
a plurality of judgement means, each connected to said storage means and a corresponding one of said plurality of arithmetic means, for testing the condition code generated by said storage means or the corresponding arithmetic means based on said test information received from said instruction control unit; and
decision means for detecting if a condition code change arithmetic instruction has issued before a conditional branch instruction is issued and for detecting which of the arithmetic means executes the condition code change arithmetic instruction and for selecting one of the test operations in said plurality of judgement means based on the result of the detection;
said instruction control unit being connected to said decision means for deciding on the next instruction to be issued based on the selected result of the test operation.

9. An information processing system according to claim 8, wherein one of said plurality of judgement means is commonly connected to said storage means and one of said arithmetic means, said commonly connected judgement means comprising means for selecting said condition code of the corresponding arithmetic means on the condition that the arithmetic means has executed before said condition code change arithmetic instruction is issued and for selecting said condition code of said storage means on the condition that the arithmetic means has not executed before said condition code change arithmetic instruction.

10. An information processing system according to claim 9, wherein said decision means comprises means for storing a plurality of state signals each of which represents whether or not a corresponding arithmetic means executes said condition code change arithmetic instruction.

11. An information processing system according to claim 10, wherein the number of said arithmetic means is two.

12. An information processing system according to claim 11, wherein said decision means comprises selecting means for generating a signal to select one of said plurality of judgement means based on one of the stored state signals.

13. An information processing system according to claim 11, wherein said decision means comprises means for generating a signal to control said selecting means based on said stored state signals.

14. An information processing system comprising:
an instruction control unit for issuing instructions from a user program and for generating test information designated by a conditional branch instruction when the conditional branch instruction is issued;
an arithmetic section divided into a plurality of arithmetic units, each arithmetic unit comprising an arithmetic means for executing arithmetic instructions, means for generating a condition code determined by the result of the instruction execution and judgment means for testing a condition code based on said test information from said instruction control unit; and
decision means for detecting which of the arithmetic means executes a condition code change arithmetic instruction for detecting if the condition code change arithmetic instruction exists immediately before said conditional branch instruction in said user program and for selecting one of the results of the test operations in said judgement means, based on the result of the detection;
said instruction control unit being connected to said decision means for deciding on the next instruction to be issued based on the selected result of the test operation.

15. An information processing system according to claim 14, wherein said decision means includes means for invalidating said results of the test operation other than the selected one result.

16. An information processing system according to claim 15, wherein the number of said arithmetic units is two.

17. An information processing system according to claim 16, wherein said decision means comprises means for storing a state signal which represents whether one of the two arithmetic means executes a condition code change arithmetic instruction and means for supplying a signal which is the complement of said stored state signal to the other arithmetic means.

18. An information processing system according to claim 14, wherein said instruction control unit includes means for generating a mask of the conditional branch instruction as said test information.

19. An information processing system according to claim 18, wherein each judgement means comprises means for decoding said condition code, and means for comparing said mask with the decoded condition code.

20. An information processing system according to claim 17, which further comprises storage means commonly connected to said plurality of condition code generating means for storing a condition code generated by one of said condition code generating means, said storage means storing a new condition code when any of said condition code generating means generates said condition code, means commonly connected to said storage means and one of said condition code generating means for selecting one of the condition codes generated by said storage means and the condition code generating means, and means for generating a signal to control said selecting means based on said stored state signal.

21. An information processing system comprising:
   an instruction control unit for issuing instructions and for generating test information designated by a conditional branch instruction when the conditional branch instruction is issued;
   a plurality of arithmetic means, each for executing arithmetic instructions, each for generating a condition code when a condition code change arithmetic instruction is executed;
   a plurality of judgement means, each connected to a corresponding one of said plurality of arithmetic means, and each for testing a condition code generated by the corresponding arithmetic means based on said test information received from said instruction control unit; and
   decision means for detecting which of the arithmetic means executes a condition code change arithmetic instruction and for selecting one of the results of the test operations in said plurality of judgement means, based on the result of the detection;
   said instruction control unit being connected to said decision means for deciding on the next instruction to be issued based on the selected result of the test operation.

22. An information processing system comprising:
   an instruction control unit for issuing instructions from a user program and for generating test information designated by a conditional branch instruction when the conditional branch instruction is issued;
   a plurality of arithmetic means each for executing arithmetic instructions and each for generating a condition code when a condition code change arithmetic instruction is executed;
   a storage means commonly connected to said plurality of arithmetic means for storing a condition code generated by one of said arithmetic means, said storage means storing a new condition code when any of said arithmetic means generates said condition code;
   a plurality of judgement means, each connected to said storage means and said corresponding arithmetic means, and each for testing a condition code generated by said storage means and said corresponding arithmetic means based on said test information received from said instruction control unit and for generating the result of the test operation; and
   decision means for detecting which of the arithmetic means executes a condition code change arithmetic instruction and for detecting if the condition code change arithmetic instruction exists immediately before said conditional branch instruction in said user program and for selecting one of the results of the test operation in said plurality of judgement means, based on the result of the detection;
   said instruction control unit being connected to said decision means for deciding on the next instruction to be issued based on the selected result of the test operation.

23. An information processing system comprising:
   an instruction control unit for issuing instructions from a user program and for generating test information designated by a conditional branch instruction when the conditional branch instruction is issued;
   a first arithmetic unit comprising first arithmetic means for executing aritmetic instructions and for generating a condition code representing the result of instruction execution obtained therein and first test means for testing the condition code obtained by said first arithmetic means based on said test information;
   second arithmetic means for executing arithmetic instructions and for generation a condition code representing the result of instruction execution obtained therein and second storage means connected to said first arithmetic means and said second arithmetic means for storing a condition code that is newly obtained by either one of said first and second arithmetic means and second test means for testing the condition code stored in said storage means based on said test information; and
   decision means for detecting if a condition code change arithmetic instruction exists immediately before the conditional branch instruction in the user program and for selecting one of the results of the test operations in said first test means and said second test means;
   said instruction control unit being connected to said decision means for deciding on the next instruction to be issued based on the selected result of the test operation from said decision means.

* * * * *